UNITED STATES PATENT OFFICE.

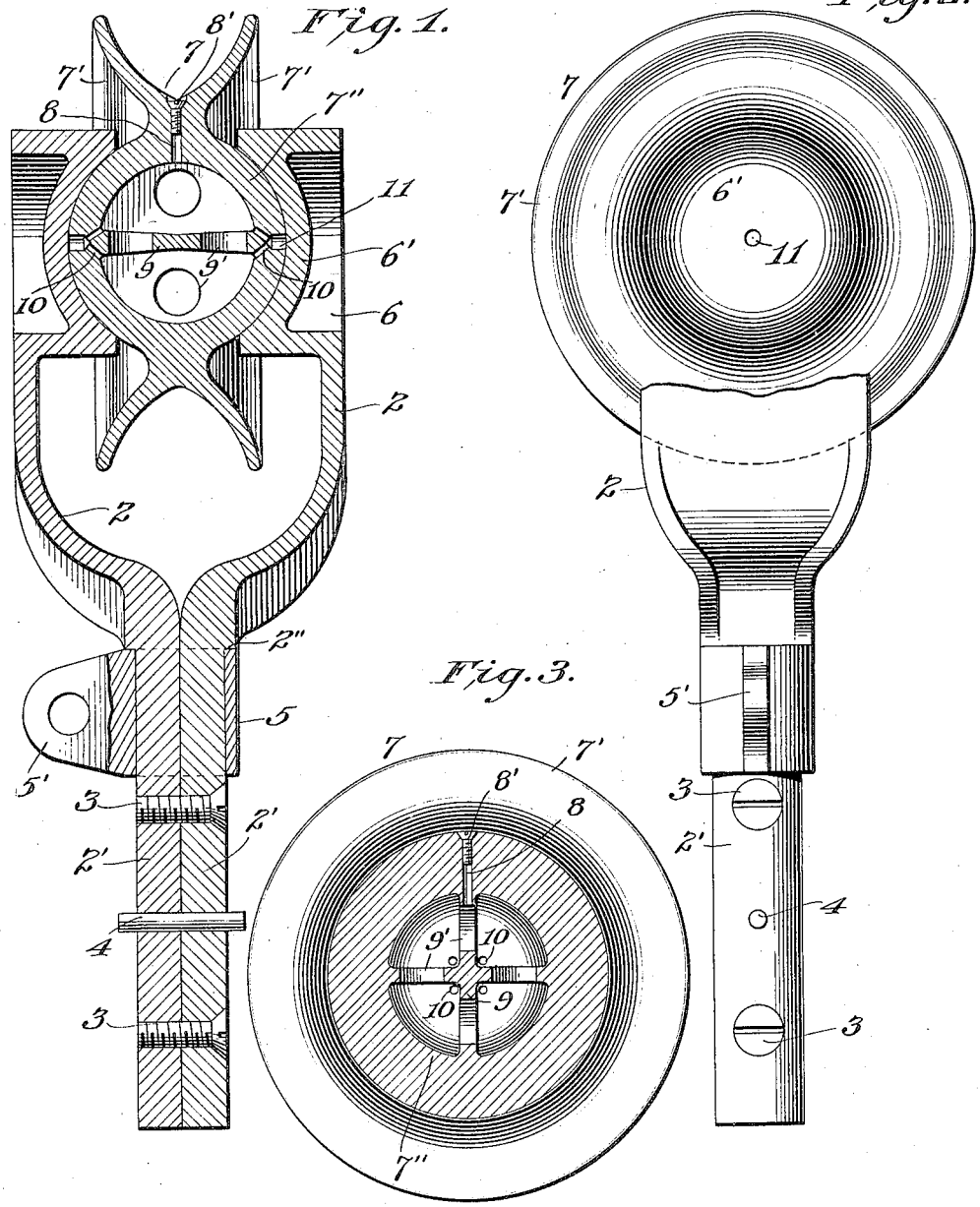

STEPHEN TULLY, JR., OF PHILADELPHIA, PENNSYLVANIA.

BALL-BEARING TROLLEY-WHEEL AND HARP.

No. 902,781.

Specification of Letters Patent.

Patented Nov. 3, 1908.

Application filed February 27, 1908. Serial No. 418,069.

*To all whom it may concern:*

Be it known that I, STEPHEN TULLY, Jr., a citizen of the United States, residing at Philadelphia, in the county of Philadelphia and State of Pennsylvania, have invented certain new and useful Improvements in Ball-Bearing Trolley-Wheels and Harps, of which the following is a specification.

My invention relates to trolley wheels and harps or mounts on which they are carried, and particularly to a trolley wheel having lateral movement in its bearings from a true vertical position as well as a movement of rotation around a vertical axis and a horizontal axis, the object being to provide a wheel which being laterally rotatable on an axial center from one side to the other of a vertical plane, accordingly reduces the friction between the wheel and wire, thereby lessening the cost of maintenance of both the wheel and the wire.

A minor object is to provide for carrying lubricating fluid within the wheel itself and permitting said fluid to flow out into contact with the face of the wheel and its bearings.

The invention consists in the arrangement of parts and details of construction illustrated in the accompanying drawings and specifically set forth in the claims appended.

Figure 1, is a longitudinal section of a wheel and harp constructed according to my invention. Fig. 2, is a side elevation thereof one of the supporting arms of the harp being broken away. Fig. 3, is a vertical section of the wheel.

Like reference characters throughout the several views designate like parts.

2—2 designates the two arms or sections of the harp which are separated from each other at their upper ends and contact with each other along their lower portions, the inner faces of these lower portions or shanks 2' being flat and their outer faces curved as shown so that when placed together as in Fig. 1, they may be inserted within the usual tubular socket formed on the upper end of the trolley pole. The two sections are held engaged with each other by screws 3 and a pin 4 is provided whereby the harp may be keyed to the pole. Surrounding the shanks 2' and bearing against a shoulder 2" is a sleeve 5 provided with a perforated projecting lug 5' by which the usual trolley pole cord may be attached to the pole. It is obvious that the shanks 2' may be held within the trolley pole in any suitable manner and that the wheel will have a movement of rotation within the pole against the rounded outer faces of the shanks 2', unless keyed to the socket by pin 4.

At their upper ends the arms 2 are broad ended and provided with a bearing head 6 cast therewith. Preferably the upper ends of the arms project inwardly somewhat and are there formed with a concavo-convex web 6', the interior surface of which is smooth and semi-spherical and forms the bearing surface for a wheel 7. The wheel 7 has the usual rim flanges 7' and a spherical central portion 7", whose outer face is practically smooth and contacts for its whole extent between the rim flanges with the concave surface 6' of the bearing 6. The interior of this spherical portion 7" is hollow and forms an oil chamber from which outlets lead to the horizontal axis of the wheel and from which a passage 8 extends to the periphery. Through this passage which is normally closed by a screw stopper or plug 8', oil may be introduced into the central oil chamber.

The central chamber is divided by radial partitions 9 preferably four in number which are formed integral with the walls of the spherical chamber. These partitions are perforated as at 9' or otherwise formed not to entirely divide the oil chamber so that the oil may pass through the partitions and that the partitions shall act to stir up the oil and prevent it from coagulating.

At opposed points of the spherical shell or chamber, ducts 10 lead from the space between the partitions to the axial passages 11 which open upon the outer surface of the central sphere at the axis thereof. It will be seen that the dividing walls or partitions 9 by reason of the openings therethrough only partially separate the main oil chamber into smaller chambers and this construction provides that the division walls shall act as paddles to keep the oil in constant movement and agitation so long as the wheel is in motion, thus making possible the lubrication of the wheel to the last drop of oil in the chambers.

It is also to be pointed out that the rotation of the wheel against the concave face 6' will draw the oil out through the passages 10 and 11 and that a thin film of oil will be distributed entirely over the convex face of the spherical bearings between the wheel and the concave faces 6'. It will also be seen that inasmuch as the central spherical portion of the wheel is a true sphere, it will turn not only rotatively but also laterally, in the manner of a universal joint and that the wheel therefore may turn in a horizontal plane as if its axis was vertical, and also with said vertical axis at an angle to a horizontal plane, thus the wheel is universally mounted and is able to turn on its bearings freely practically in any direction, and will thus conform absolutely to the turns, bends and inclinations of the trolley wire. This greatly lessens the friction between the trolley wheel and wire and thus as before stated lessens the cost of maintenance. The wheel will adjust itself automatically to any sag, swing or angle of the trolley and yet remain in proper contact with the trolley wire. This is particularly valuable in roads where there are numerous curves or where the trolley wire and wheel make sharp bends relatively to each other.

For the sake of clearness, I have shown the wheel as formed in one piece, but it is of course understood that I may make it in any manner I desire or find suitable. While I have shown the plug 8' as being inserted through the periphery of the wheel, the oil inlet passage might extend out at another portion of the wheel. It will also be understood that the bearings 3' might be reduced in size, though their inner surfaces would of course keep the curve of the spherical portion of the wheel, and thus the angle through which the wheel could turn laterally would be greater.

Having thus described my invention what I claim as new and desire to secure by Letters Patent is:

1. In a trolley wheel and harp therefor, opposed upwardly extending arms separated at their upper ends and there provided on their inner faces with concave bearings, and a wheel having a spherical central portion provided with unbroken smooth outer bearing surfaces, said spherical portion inclosing an oil chamber, transverse radially arranged partitions dividing the interior of the chamber and having openings through them and lateral oil outlet ducts leading from the chamber on each side of said partitions to central passages one on each side, at the axial center of the spherical portion whereby oil is conducted to the outer lateral surfaces of the spherical portion.

2. In a trolley wheel and harp therefor, opposed upwardly extending arms separated at their upper ends and there provided on their inner faces with concave bearings, the lower ends of said arms contacting with each other and having rounded exterior faces, means for holding said arms together, a sleeve having an eye to which the trolley rope may be attached, a wheel having a spherical central portion inclosing an oil chamber, said wheel being located between and bearing against the said curved bearings, and transverse radially arranged partitions dividing the interior of said oil chamber, said partitions having openings through them and being provided with an oil inlet and lateral oil outlets at an axial center of said spherical portion.

STEPHEN TULLY, Jr.

Witnesses at signing:
STEPHEN TULLY, Sr.
LYNDELL MYERS.